(12) United States Patent
Hofer et al.

(10) Patent No.: US 11,167,634 B2
(45) Date of Patent: Nov. 9, 2021

(54) DRIVE TRAIN FOR A HYBRID VEHICLE, IN PARTICULAR FOR A TEMPORARILY FOUR WHEEL DRIVEN MOTOR VEHICLE

(71) Applicant: Magna Powertrain GmbH & Co KG, Lannach (AT)

(72) Inventors: Gerhard Hofer, Pinggau (AT); Hansdieter Wiedner, Vorau (AT); Stefan Tischlinger, Graz (AT)

(73) Assignee: MAGNA POWERTRAIN GMBH & CO KG, Lannach (AT)

( * ) Notice: Subject to any disclaimer, the term of this patent is extended or adjusted under 35 U.S.C. 154(b) by 0 days.

(21) Appl. No.: 16/604,409

(22) PCT Filed: Apr. 3, 2018

(86) PCT No.: PCT/EP2018/058441
§ 371 (c)(1),
(2) Date: Oct. 10, 2019

(87) PCT Pub. No.: WO2018/192770
PCT Pub. Date: Oct. 25, 2018

(65) Prior Publication Data
US 2020/0114751 A1  Apr. 16, 2020

(30) Foreign Application Priority Data

Apr. 18, 2017 (DE) .......................... 102017206516.8

(51) Int. Cl.
*B60K 6/52* (2007.10)
*B60K 6/365* (2007.10)
(Continued)

(52) U.S. Cl.
CPC .................. *B60K 6/52* (2013.01); *B60K 6/36* (2013.01); *B60K 6/365* (2013.01); *B60K 6/387* (2013.01); *B60K 17/02* (2013.01); *B60K 17/34* (2013.01)

(58) Field of Classification Search
None
See application file for complete search history.

(56) References Cited

U.S. PATENT DOCUMENTS 5,249,637 A * 10/1993 Heidl ...................... F02B 67/04
180/65.25
6,857,985 B2 * 2/2005 Williams ............... B60K 6/547
477/5
(Continued)

FOREIGN PATENT DOCUMENTS

DE      19919455 A1    11/2000
DE    102005049992 A1   4/2007
(Continued)

OTHER PUBLICATIONS

DE 19919455C2 machine translation (Year: 2000).*
(Continued)

*Primary Examiner* — Dirk Wright
(74) *Attorney, Agent, or Firm* — Dickinson Wright PLLC

(57) ABSTRACT

A drive train for a hybrid vehicle, in particular for a temporarily four-wheel-driven motor vehicle, wherein the drive train comprises a first partial drive train assigned to a primary axle and a second partial drive train assigned to a secondary axle, and wherein the first partial drive train comprises a first drive unit configured as an internal combustion engine and a second drive unit configured as an electric machine and a change transmission, is refined in that the hybrid drive train is inexpensive to produce, has low $CO_2$ emissions in operation, and may be used in a drive train of a temporarily four-wheel-driven motor vehicle. This is (Continued)

Figure 1:
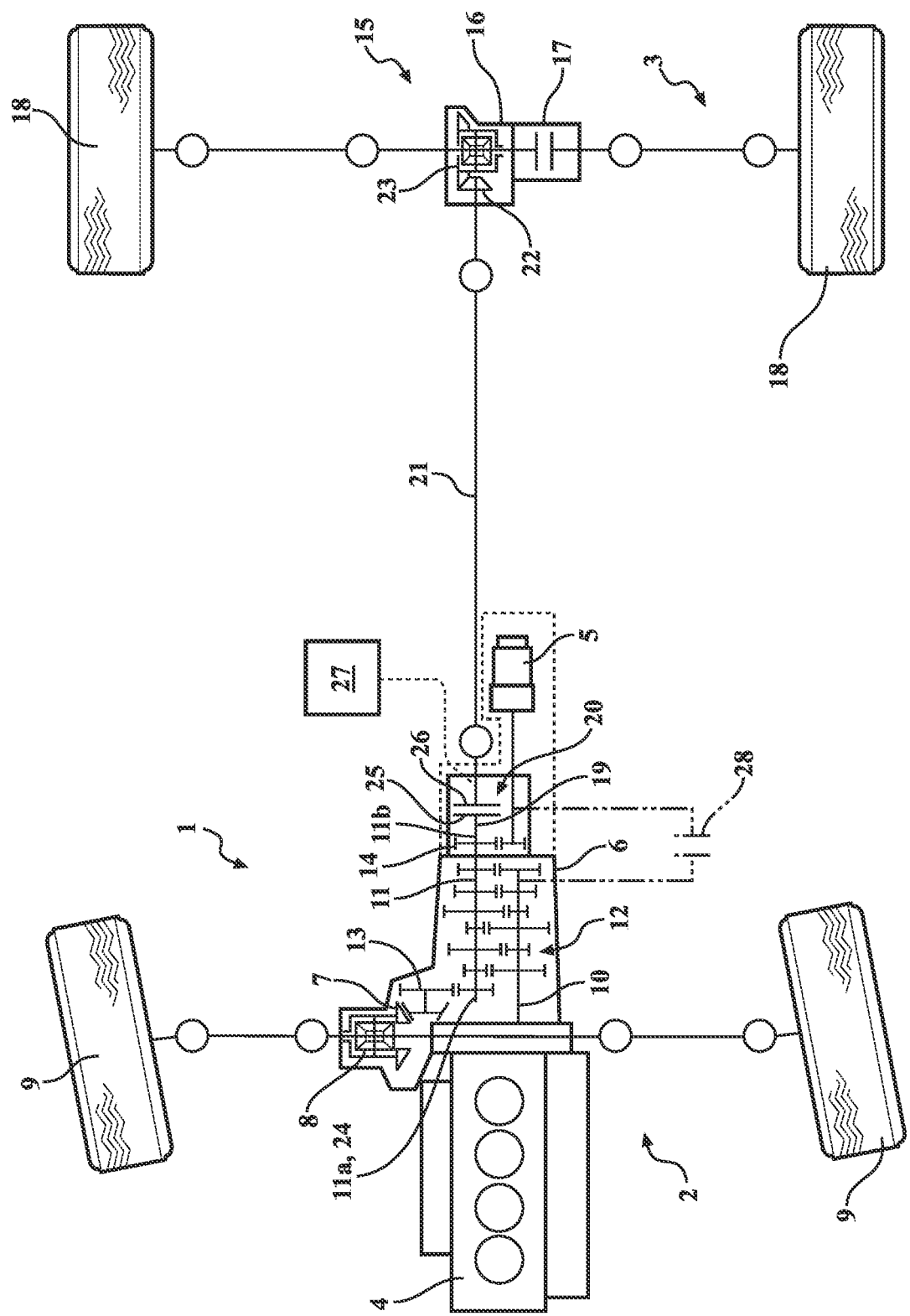

achieved in that change transmission comprises an input shaft and an output shaft, wherein the first drive unit is coupled to the primary axle via the change transmission, and wherein the second drive unit is coupled to the primary axle via the input or output shaft of the change transmission, and wherein the drive train furthermore comprises a clutch arrangement, wherein the secondary axle can be coupled in a driving manner to the primary axle by means of the clutch arrangement.

13 Claims, 1 Drawing Sheet

(51) Int. Cl.
  *B60K 6/387* (2007.10)
  *B60K 6/36* (2007.10)
  *B60K 17/02* (2006.01)
  *B60K 17/34* (2006.01)

(56) References Cited

U.S. PATENT DOCUMENTS

| | | | | |
|---|---|---|---|---|
| 8,590,648 | B2* | 11/2013 | Poschmann | B60L 50/61 180/65.22 |
| 9,457,788 | B2* | 10/2016 | Yukawa | B60W 10/08 |
| 9,636,988 | B2* | 5/2017 | Pinschmidt | F16H 48/06 |
| 9,643,490 | B2* | 5/2017 | Gassmann | B60K 17/354 |
| 9,987,918 | B2* | 6/2018 | Haupt | B60K 6/48 |
| 10,882,512 | B2* | 1/2021 | Kobler | B60K 6/40 |
| 2004/0082433 | A1 | 4/2004 | Williams | |
| 2011/0094809 | A1 | 4/2011 | Poschmann et al. | |
| 2016/0031429 | A1 | 2/2016 | Yukawa et al. | |
| 2019/0255934 | A1* | 8/2019 | Rehr | B60K 1/02 |

FOREIGN PATENT DOCUMENTS

| | | |
|---|---|---|
| DE | 102013200938 A1 | 8/2013 |
| DE | 102013204506 A1 | 9/2014 |
| DE | 102016108916 A1 | 11/2016 |
| DE | 102017206205 A1 | 11/2017 |
| DE | 102016221880 A1 | 5/2018 |
| EP | 2913563 A1 | 9/2015 |
| WO | 2009021574 A1 | 2/2009 |
| WO | 2013113907 A1 | 8/2013 |

OTHER PUBLICATIONS

DE 102017206205 A1 machine translation (Year: 2017).*
DE 1020166221880 A1 machine translation (Year: 2016).*
WO 2009021574 A1 machine translation (Year: 2009).*
Written Opinion of the International Searching Authority for International Application No. PCT/EP2018/058441; dated Jul. 6, 2018; 6 pages.
International Search Report (ISR) for International Application No. PCT/EP2018/058441; dated Jul. 6, 2018; 7 pages; English Translation of the ISR is Included.

* cited by examiner

DRIVE TRAIN FOR A HYBRID VEHICLE, IN PARTICULAR FOR A TEMPORARILY FOUR WHEEL DRIVEN MOTOR VEHICLE

CROSS-REFERENCE TO RELATED APPLICATIONS

This application is a National Stage of International Application No. PCT/EP2018/058441, filed Apr. 3, 2018, which claims priority to DE 102017206516.8 filed Apr. 18, 2017. The entire disclosures of each of the above applications are incorporated herein by reference.

FIELD OF INVENTION

The present invention concerns a drive train for a hybrid vehicle, in particular for a temporarily four-wheel-driven motor vehicle.

BACKGROUND OF THE INVENTION

This section provides information related to the present disclosure which is not necessarily prior art.

Four-wheel-driven vehicles, also described below as all-wheel-driven vehicles, are known in designs both with permanent four-wheel drive and also with switchable four-wheel drive.

In motor vehicles with four-wheel drive, it is known to use a central differential gear to distribute the drive power between the front axle and the rear axle. Thus the division of the drive torque between the front axle and the rear axle is fixedly predefined.

In general, all-wheel drive vehicles are constantly being refined, partly because of the higher fuel consumption and observation of the rising requirements in relation to emissions. In particular, the focus here lies on the at least partial electrification of the motor vehicle drive. The at least partial hybridization of the motor vehicle drive creates a compromise between reduced fuel consumption, adequate range and good performance.

Drive trains for motor vehicles in a design with an electric machine fitted in addition to the internal combustion engine (hybrid vehicles) are known from the prior art. Here, the electric machine is integrated in the drive train with the internal combustion engine. Furthermore, embodiments are known in which a separate electric rear axle is used as a secondary axle, in addition to the main front-wheel drive unit with permanent front-axle drive. Such a drive with electric rear axle is not however recognized as a true all-wheel drive system, since the maximum torque is limited and the availability of torque at the secondary axle is limited thermally or with respect to energy.

Hybrid vehicles indeed meet the requirements with respect to the prescribed emissions standards, and the $CO_2$ emissions can be drastically reduced, but the costs for such drive trains are high. This is mainly because the function of the electric machine is implemented with voltages above the 60 V limit, and hence a correspondingly great technical complexity is required in the field of safety.

SUMMARY OF THE INVENTION

This section provides a general summary of the disclosure, and is not a comprehensive disclosure of its full scope or all of its features.

It is an object of the invention to refine a drive train for a hybrid vehicle such that the hybrid drive train is inexpensive to produce, has low $CO_2$ emissions in operation, and may be used in a drive train of a temporarily four-wheel-driven motor vehicle.

This object is achieved by a drive train for a hybrid vehicle, in particular for a temporarily four-wheel-driven motor vehicle, wherein the drive train comprises a first partial drive train assigned to a primary axle and a second partial drive train assigned to a secondary axle, and wherein the first partial drive train comprises a first drive unit configured as an internal combustion engine and a second drive unit configured as an electric machine and a change transmission, wherein the change transmission comprises an input shaft and an output shaft, and wherein the first drive unit is coupled to the primary axle via the change transmission, and wherein the second drive unit is coupled to the primary axle via the input or output shaft of the change transmission, and wherein a clutch arrangement is arranged between the first partial drive train and the second partial drive train so that the secondary axle can be coupled in a driving manner to the primary axle by means of the clutch arrangement.

Because of the design of the drive train according to the invention with an internal combustion engine as the main drive unit and an electric machine as the additional drive unit, different operating modes can be implemented such as all-wheel drive, disconnect (i.e. if no all-wheel drive is required, the partial drive train of the secondary axle is shut down), recuperation (the entire braking energy is conducted into the electric machine operated as a generator), boosting (acceleration of the motor vehicle by positive drive moments from both the internal combustion engine and the electric machine), and purely electric driving. In this way, an efficient and variable all-wheel drive system can be implemented. In particular, by the use of a powerful electric machine based on low-voltage technology, a drive train can be implemented which is cheaper to produce since no safety-relevant measures are required.

A further advantage of the hybrid drive train according to the invention for a motor vehicle is that both the main drive unit and the electric machine in the total drive train of a vehicle are assigned to the permanently driven axle. Here the electric machine is arranged as a second drive unit between the main transmission (change transmission) and the partial drive train of the secondary axle. According to the invention, the partial drive train may be decoupled via a clutch arrangement. In "decoupled" state, the electric machine remains connected to the primary axle. The secondary axle is engaged only for "all-wheel drive" operation.

The clutch arrangement, provided in the region of the torque transmission element between the partial drive train of the front axle and the partial drive train of the rear axle, is configured as a multiplate clutch. The design as a multiplate clutch allows the torque to be distributed variably between the front axle and rear axle.

A further advantage of the use of the hybrid drive train for a temporarily four-wheel-driven motor vehicle is that the "hybrid" operating mode can be regulated independently of the "all-wheel drive" operating mode, and vice versa. This allows the hybrid mode to be regulated in favor of fuel efficiency, and the all-wheel drive mode to be regulated or controlled in favor of improved performance and driving dynamics.

The hybrid drive train according to the invention for a motor vehicle may be used as a hybrid module for both all-wheel drive motor vehicles and for front-wheel drive motor vehicles. This is possible since the electric machine as a second drive unit is assigned to the partial drive train of the front axle, and only after this—in the direction of the rear axle—is the clutch arrangement provided in the region of the torque transmission element. The electric machine is connected in a driving manner to the secondary output of the main transmission. With this design, the partial drive train of the front axle comprising the hybrid drive may also be used in the vehicle architecture of a conventional two-wheel-driven motor vehicle, whereby a platform strategy may be implemented. When the first partial drive train is used in a two-wheel-driven motor vehicle, the clutch arrangement for driving connection between the primary axle and secondary axle may be omitted.

In connection with the invention, it should be pointed out that a "driving" connection means a direct or indirect connection between two rotatable components which stand in a fixed rotational relationship to each other. If an element "can be connected" or "can be coupled", this means a connection which may optionally also be a separable connection (for example, an indirect connection between the two elements via a clutch or switch element).

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The drawing shows:

FIG. 1 a diagrammatic depiction of the hybrid drive train according to the invention of an all-wheel drive motor vehicle.

DESCRIPTION OF THE INVENTION

FIG. 1 shows a hybrid drive train 1 of a temporarily four-wheel-driven motor vehicle, with a front axle configured as a primary axle 2 and a rear axle configured as an optionally engageable secondary axle 3. The hybrid drive is here formed by a first drive unit 4 configured as an internal combustion engine, and by a second drive unit 5 configured as an electric machine. The second drive unit 5 is designed as an electric machine based on the 60 V low-voltage technology.

The first and second drive units 4, 5 are assigned to the first partial drive train of the primary axle 2. As evident from the diagrammatic depiction in FIG. 1, the first drive unit 4 is permanently connected to the front axle of the motor vehicle, comprising the front axle differential 8, via a main transmission configured as a change transmission 6 and an angular gear 7, so that the front wheels 9 sitting on the front axle 2 are permanently driven by the first drive unit 5 during travel.

A differential gear is known in itself, and in this arrangement on the front axle is also described as an axle differential which compensates for differences in rotation speed between the two output elements when the motor vehicle travels around corners. The output elements are connected rotationally fixedly to the two half-shafts of the front axle 5. Furthermore, via the differential gear, the drive torque from the hybrid drive unit can be divided over the two half-shafts.

The change transmission 6 has an input shaft 10 and an output shaft 11 arranged spaced therefrom and parallel thereto. The input shaft 10 and the output shaft 11 are connected together in a driving manner via a plurality of gear stages 12, in order to implement a plurality of selectable gear stages. A more detailed description of the change transmission is not necessary at this point since change transmissions are generally known to the person skilled in the art. The input shaft 10 is coupled to an output shaft of the first drive unit. The output shaft 11 has a first and a second end region 11a, 11b. The first end region 11a as the primary output 24 is connected to the angular gear 7 via a spur gear stage 13. The second drive unit 5 is connected to the front axle 2 via the second end region 11b as a secondary output 19 of the output shaft 11 and via a spur gear stage 14 (gear stage). In a refinement, the gear stage may also be configured with multiple gears. A driving connection between the output shaft 11 and the angular gear 7 or the primary axle 2 may also be achieved via a shaft arranged at an angle and beveloid toothing.

In a further embodiment, the second drive unit 5 may be configured with a reduction gear mechanism which serves to reduce rotation speed and increase torque. The reduction gear mechanism may be configured as an epicycloid gear mechanism. As a further alternative, the reduction gear mechanism may be integrated in the gear stage. The reduction gear mechanism may be configured as a selectable gear mechanism and hence allow more than one translation ratio.

The second gear unit 5 may be established in its own housing on a housing of the main transmission. Alternatively, the second gear unit 5 may be arranged in a common housing (illustrated in broken lines in FIG. 1) which comprises the second drive unit 5, the gear stage 14 and the clutch arrangement 20.

The partial drive train 15 of the rear axle 3 comprises a rear axle differential 16, a clutch arrangement 17 and rear wheels 18.

The rear axle 3, which forms the secondary axle in the hybrid drive train 1, may if required be driven by the hybrid drive in addition to the front axle 2.

To this end, a clutch arrangement 20 is provided on the secondary output 11b for optional "connection" or "separation" of the output shaft 11 of the change transmission 12 relative to the rear axle 3. The clutch arrangement 20 comprises a friction clutch (multiplate clutch) and an actuator for actuating the friction clutch. The actuator is controlled by a control device 27. The clutch arrangement 20, i.e. the friction clutch, has a first clutch element 25 and a second clutch element 26 which can be coupled to the first clutch element 25. The first clutch element 25 here comprises a clutch hub carrying a plurality of first clutch plates. The clutch hub is connected rotationally fixedly to the output shaft 11. The second clutch element 26 comprises a clutch cage which is here connected rotationally fixedly to the torque transmission element 21 via a carrier spider, and also comprises a plurality of second clutch plates. The first clutch plates engage in alternating arrangement in the intermediate spaces of the second clutch plates. On actuation of the clutch arrangement, the plates are moved axially and pressed against each other; the output shaft carries the torque transmission element. The clutch arrangement 20 may be switched mechanically, hydraulically, pneumatically or electromagnetically.

By corresponding actuation of the multiplate clutch and axial shifting of the plates, a force-fit connection can be created between the output shaft 11 and the torque transmission element 21, and a torque distribution of between 0% and 100% can be achieved between the primary axle and secondary axle.

The output of the clutch arrangement 20 is connected to the one end of a torque transmission element 21, e.g. a propeller shaft. At its other end region, the torque transmission element 21 is connected to a bevel gear 22 standing in engagement with a ring gear 23 which is connected to a differential cage of the rear axle differential 16.

The function of the rear axle differential 16 corresponds to the function described with respect to the front axle differential 8.

To prevent the torque transmission element 21 and the differential cage of the rear axle differential 16 from rotating unnecessarily, and hence consuming energy, during travel when the clutch arrangement 20 is disengaged, i.e. in "purely front-wheel drive" operating mode, the clutch 17 is configured as a separating clutch.

If, during travel, switching to "all-wheel drive" operating mode is desired, firstly the stationary torque transmission element 21 is set in rotation again. For this, the clutch arrangement 17 is initially engaged again and the torque transmission element 21 is brought up to speed by means of the rear axle differential 16, starting from the rear axle 3 which is rotating because of the travel movement. Then, by actuating the clutch arrangement 20, a friction-fit connection is created between the torque transmission element 21 and the output shaft 11 in order to transmit a torque. The vehicle is now operated in all-wheel drive mode.

In a further alternative embodiment schematically shown in broken lines in FIG. 1, a further clutch arrangement 28 is provided between the second drive unit 5 and the input shaft 10 or output shaft 11. In this embodiment, both the secondary axle 3 and the second drive unit 5 may be decoupled from the primary axle 2 independently of each other.

LIST OF REFERENCE SIGNS

1 Hybrid drive train
2 Primary axle
3 Secondary axle
4 First drive unit
5 Second drive unit
6 Change transmission
7 Angular gear
8 Front axle differential
9 Front wheels
10 Input shaft
11 Output shaft
12 Gear stages
13 Spur gear stage
14 Spur gear stage
15 Partial drive train
16 Rear axle differential
17 Clutch arrangement
18 Rear wheels
19 Secondary output
20 Clutch arrangement
21 Torque transmission element
22 Bevel gear
23 Ring gear
24 Primary output
25 First clutch element
26 Second clutch element

The invention claimed is:

1. A drive train for a temporarily four-wheel-driven hybrid motor vehicle, wherein the drive train comprises a first partial drive train assigned to a primary axle and a second partial drive train assigned to a secondary axle, and wherein the first partial drive train comprises a first drive unit configured as an internal combustion engine and a second drive unit configured as an electric machine and a change transmission, wherein the change transmission comprises an input shaft and an output shaft, and wherein the first drive unit is coupled to the primary axle via the change transmission, and wherein the second drive unit is coupled to the primary axle via the output shaft of the change transmission, and wherein a first clutch arrangement is arranged between the first partial drive train and the second partial drive train for allowing the secondary axle to be coupled in a driving manner to the primary axle by means of the clutch arrangement and wherein a second clutch arrangement connects the input shaft to the second drive unit to allow the secondary axle and the second drive unit to be coupled from the primary axle independently from one another.

2. The drive train as claimed in claim 1, wherein the primary axle comprises a first and a second half-shaft and an axle differential, and the drive torque from the first and second drive units is divided over the two half-shafts via the axle differential.

3. The drive train as claimed in claim 1, wherein the output shaft of the change transmission has a primary output and a secondary output, and the primary output is connected in a driving manner to the axle differential via a spur gear stage and an angular gear.

4. The drive train as claimed in claim 1, wherein the second drive unit is connected in a driving manner to the secondary output of the output shaft via a gear stage with a spur gear stage, so that in both the coupled and the decoupled state of the secondary axle, the second drive unit is connected in a driving manner to the primary axle.

5. The drive train as claimed in claim 1, wherein a clutch arrangement is arranged between the second drive unit and the secondary output of the output shaft.

6. The drive train as claimed in claim 1, wherein the second drive unit has a reduction gear mechanism.

7. The drive train as claimed in claim 1, wherein the clutch arrangement is a friction clutch, wherein a control device is assigned to the friction clutch, and wherein by actuation of the clutch arrangement, the force-fit connection between the output shaft of the first partial drive train and the secondary axle are adjusted for torque distribution of the drive torque from the first and second drive units.

8. The drive train as claimed in claim 1, wherein the drive train furthermore comprises a propeller shaft, and wherein the electric machine is arranged in a parallel configuration to the propeller shaft.

9. The drive train as claimed in claim 1, wherein the change transmission and the second drive unit are located in a common housing.

10. The drive train as claimed in claim 1, wherein the second partial drive train comprises an axle differential and a clutch arrangement.

11. The drive train as claimed in claim 1, wherein the second drive unit is a 60 volt or less electric machine.

12. A drive train for a temporarily four-wheel-driven hybrid motor vehicle, comprising:
a first partial drive train assigned to a primary axle and a second partial drive train assigned to a secondary axle;
the first partial drive train including a first drive unit configured as an internal combustion engine and a second drive unit configured as an electric machine;
a change transmission comprising an input shaft and an output shaft, wherein the first drive unit is coupled to the primary axle via the change transmission, and wherein the second drive unit is coupled to the primary axle via the input or output shaft of the change transmission;

a first clutch arrangement arranged between the first partial drive train and the second partial drive train for allowing the secondary axle to be coupled in a driving manner to the primary axle by means of the clutch arrangement;

a second clutch arrangement connecting the input shaft to the second drive unit to allow the secondary axle and the second drive unit to be decoupled from the primary axle independently from one another.

13. The drive train as claimed in claim 12, wherein the second drive unit is a 60 volt or less electric machine.

* * * * *